H. J. SILVERNALE.
HARVESTER-RAKE.
No. 175,260. Patented March 28, 1876.
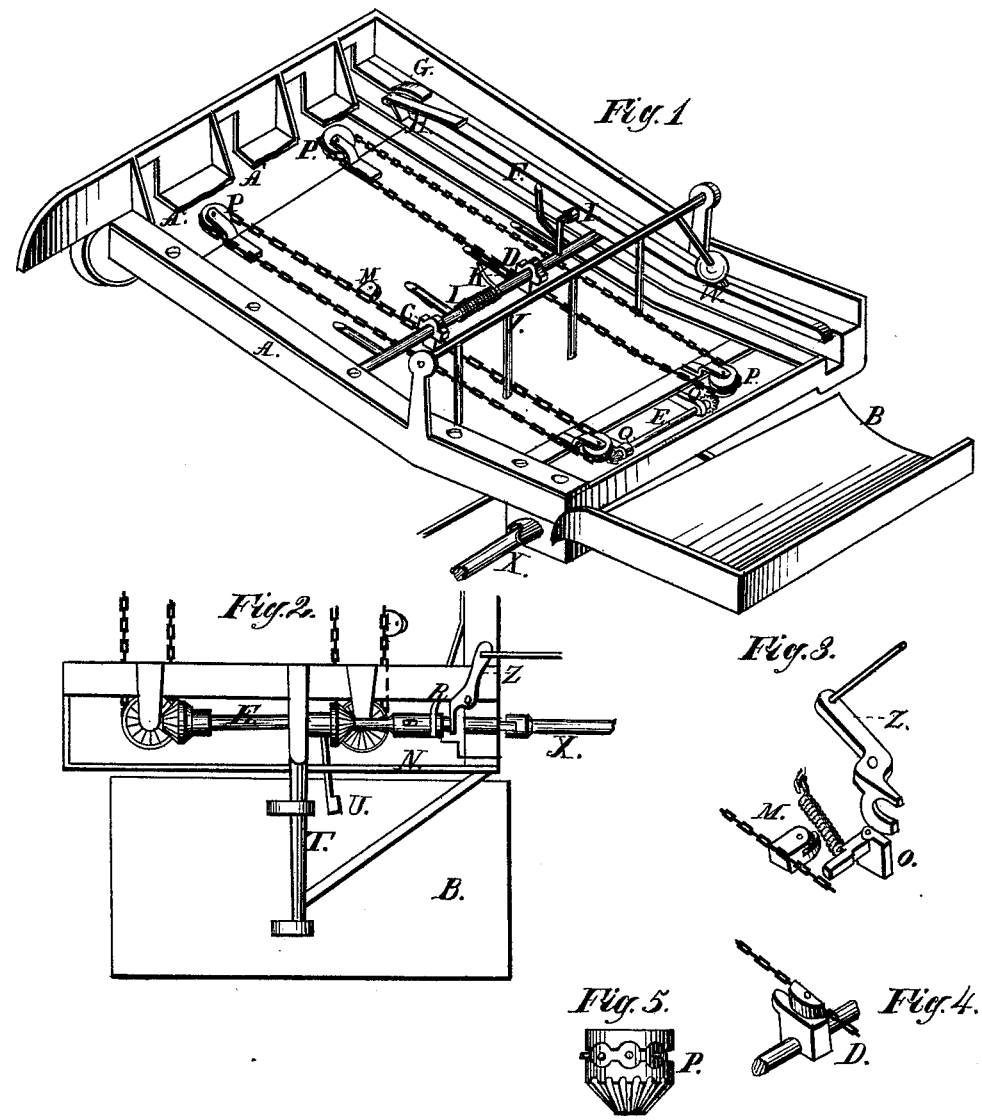
Attest:
J. B. Smith
H. Schallenberg.
Inventor:
Harvy J. Silvernale.

UNITED STATES PATENT OFFICE.

HARVEY J. SILVERNALE, OF PEWAUKEE, WISCONSIN.

IMPROVEMENT IN HARVESTER-RAKES.

Specification forming part of Letters Patent No. 175,260, dated March 28, 1876; application filed May 14, 1875.

*To all whom it may concern:*

Be it known that I, HARVEY J. SILVERNALE, of Pewaukee, in the county of Waukesha, in the State of Wisconsin, have invented certain Improvements in Harvester-Rakes and Side Droppers, of which the following is a specification:

My invention has for its object the raking of grain, when cut by a harvester, onto a dropper, and dropping the same in a bunch ready for binding. It consists in a platform, hung in rear of the cutter of a harvester, upon which the grain falls when cut, and rake-teeth, sticking up through slots in the platform, and attached to a cross bar or head, which is attached to endless chains carried around sprocket-wheels, and continued so that when the rake has carried the grain and deposited it onto the dropper, an arm on the end of the cross-bar head passes up round a sliding way, and turns the teeth of the rake down to a horizontal position, and at the same time the rake-head strikes on the end of a tilting-lever and tilts up the dropper, and the grain is dumped on the ground, and the rake is carried back by the chains till they come to the back end of the platform, when the arm of the rake-head passes under an iron, which presses it down again and turns the teeth up to a vertical position again; this arm passing over a spring on the end of the way, which, when it has passed over it, springs up again, and the arm passes under the way again, and at this point a stop on one of the chains strikes a catch on the clutch and throws it out of gear, and the rake stops till enough grain is cut and on the platform for a sheaf, when, with a foot-piece, a wire is pulled, one end of which is attached to the clutch-shifter, and pulls the clutch into gear again, and the rake goes on.

Figure 1 is a view of the platform with the top removed; Fig. 2, a sectional view of the dropper, rake, and operating works of same; Fig. 3, a view of the clutch-shifter, clutch, and stop on the chains, which throws the clutch out of gear; Fig. 4, a view of the block on the rake-head, and attached to the chains; and Fig. 5, a view of the sprocket-wheel, which moves the chains.

A is the platform; B, the dropper; C, the endless chains which carry the rake; D D, the blocks on the shaft K, and slip on same as the rake-head turns to go back after having deposited the grain onto the dropper. These blocks are secured to the chains C, and the upper part of the block is secured to the lower part of the same by a bolt through its center, so that as it passes round the sprocket-wheel it turns, and permits the rake-head to be reversed in its travel as the chains are reversed. E, the shaft which revolves the sprocket-wheels; F, a way on the side of the platform, which the arm I of the rake-head passes under as the rake moves forward, and over when it passes back, and tips the rake-teeth up and down; G, a piece of metal at the back end of the way, and above it, which the arm of the rake passes under to tip up the rake-teeth; H, a spring on the end of the way F under G, which arm I passes over and bends it down, and when the arm passes over its end it springs up again, and the arm passes under the way F, and holds the teeth in a vertical position; K, the rake-head, with teeth in it; L, a spring round the rake-head, the end of which presses against the middle strip on the top of the platform, and turns the rake-head when it arrives at the end of the platform, so that the arm I shall turn up and pass from the bottom to the top of way F after the grain is dumped onto the dropper; M, stop on the chain, which throws the clutch out of gear; N, clutch; O, catch which holds the clutch in gear; P P P P, beveled sprocket-wheels, which carry the chains C round; Q Q, beveled pinions on shaft E, gearing into wheels P; R, a spring, which holds clutch N back out of gear; S, the lower part of sprocket-wheel P. Between the top and bottom part of the sprocket-wheels the sprockets are made so that the chains will fit in, and a pin passes into every other link of the chain. T, a journal passing out from the platform, and a couple of eyes are attached to the dropper, through which the journal T passes, and the dropper tips up on that journal; U, a lever, secured by the middle to the platform, and when the rake comes forward with its load of grain it strikes on the inner end of said lever and tilts it up, and the other end strikes on the dropper and tilts it up and unloads the grain. V is another rake, hung above the platform, the teeth hanging down to prevent any loose grain from being carried forward; W, an arm with a weight on it, which holds the rake V in position; X, a coupling for connecting the shaft E to a shaft on the motor part of a harvester; Y, a rod running from the lever Z, which throws the clutch into gear, to a foot-treadle on the motor of a harvester; A', guards on the divider, so that the rake-teeth shall rise up behind the grain.

Operation: The harvester being in the field ready for work, start it up, and as the grain is cut it falls onto the platform A, and when enough is cut for a sheaf, put a foot on the treadle on the motor, and throw the clutch into gear, and the shaft E, being revolved, moves the sprocket-wheels, and with them the chains C, which brings the rake K forward, and with it the grain, and when it comes to the end of the platform the grain is thrown onto the dropper B, and the rake-head strikes the lever U, and tilts up the dropper, and the grain is unloaded onto the ground. The rake-arm I, as the blocks D pass round the sprocket-wheels, turns up over way F, the head of rake K being turned by spring L, and the teeth of the rake are turned down flat, and pass back to the other end of the platform, when arm I passes under metal piece G, and the rake-head is turned, bringing the teeth up to a vertical position, and the arm I passes over spring H to its end, when the spring rises to its position again, and the arm I passes under the spring and under way F again, ready to rake again whenever there is grain enough cut for a sheaf. The stop M at this point strikes against the catch O, and throws it out of the notch, and the spring R pulls the clutch out of gear, and the rake stops, ready to go ahead again whenever wanted.

I claim as my invention—

1. The combination of chains C, blocks D, way F, arm I, rake K, sprocket-wheels P, shaft E, and pinion Q, substantially as described.

2. The combination of clutch N, catch O, lever Z, chains C, stop M, and spring R, substantially as described.

HARVEY J. SILVERNALE.

Witnesses:
J. B. SMITH,
A. SCHATTERBERG.